(12) United States Patent
Zhao (10) Patent No.: US 9,791,751 B2
(45) Date of Patent: Oct. 17, 2017

(54) LIQUID CRYSTAL DISPLAY AND LIQUID CRYSTAL DISPLAY LOWER SUBSTRATE ASSEMBLY THEREOF

(71) Applicant: Shenzhen China Star Optoelectronics Technology Co., Ltd., Shenzhen, Guangdong (CN)

(72) Inventor: Guo Zhao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 209 days.

(21) Appl. No.: 14/423,414

(22) PCT Filed: Nov. 28, 2014

(86) PCT No.: PCT/CN2014/092473
§ 371 (c)(1),
(2) Date: Feb. 23, 2015

(87) PCT Pub. No.: WO2016/019658
PCT Pub. Date: Feb. 11, 2016

(65) Prior Publication Data
US 2016/0252764 A1    Sep. 1, 2016

(30) Foreign Application Priority Data
Aug. 6, 2014 (CN) .......................... 2014 1 0384484

(51) Int. Cl.
*G02F 1/1345* (2006.01)
*G02F 1/1362* (2006.01)

(52) U.S. Cl.
CPC ........ *G02F 1/1345* (2013.01); *G02F 1/13458* (2013.01); *G02F 1/136286* (2013.01)

(58) Field of Classification Search
CPC ............... G02F 1/1345; G02F 1/13458; G02F 1/136286
See application file for complete search history.

(56) References Cited

U.S. PATENT DOCUMENTS

| | | | | |
|---|---|---|---|---|
| 2012/0113333 A1* | 5/2012 | Oba | ....................... | G02F 1/1345 349/5 |
| 2012/0249896 A1* | 10/2012 | Yokota | .............. | G02F 1/134336 349/5 |
| 2012/0249920 A1* | 10/2012 | Hara | ....................... | G09G 3/002 349/61 |

* cited by examiner

*Primary Examiner* — Jia Pan
(74) *Attorney, Agent, or Firm* — Andrew C. Cheng (57) ABSTRACT

An LCD lower substrate assembly is assembleable with an LCD upper substrate assembly. The LCD lower substrate assembly includes a carrier board and a first alignment pad, a first alignment wire and a first group of adaption pads having a function of electrical conduction, which are arranged on the carrier board. The first alignment pad is electrically connected to the first alignment wire to receive a voltage signal and to apply the voltage signal to the first alignment wire. The first-group adaption pads are electrically connected to the first alignment wire in a spaced manner to receive the voltage signal that, after the assembly of the two substrate assemblies, is transmittable to a first group of common electrodes on the LCD upper substrate assembly. Connection portions between the adaption pads and the first alignment wire and the first-group adaption pads do not cross other alignment wires on the carrier board.

9 Claims, 2 Drawing Sheets

LIQUID CRYSTAL DISPLAY AND LIQUID CRYSTAL DISPLAY LOWER SUBSTRATE ASSEMBLY THEREOF

CROSS REFERENCE TO RELATED APPLICATIONS

This application claims the priority of Chinese Patent Application No. 201410384484.4, entitled "Liquid Crystal Display and Liquid Crystal Display Lower Substrate Assembly Thereof", filed on Aug. 6, 2014, the disclosure of which is incorporated herein by reference in its entirety.

BACKGROUND OF THE INVENTION

1. Field of the Invention

The present invention relates to the field of printing technology, and in particular to a liquid crystal display and a liquid crystal display lower substrate assembly thereof.

2. The Related Arts

Liquid crystal displays are one of the most widely used flat panel displays and include two display panels and liquid crystal interposed between the two display panels. The two display panels are respectively an array substrate assembly and a color filter substrate assembly. With the development of the liquid crystal displays, alignment wires laid on the array substrate assembly of a liquid crystal display are getting more and more and thus, inevitably, the alignment wires may be connected in a crossing condition. When the alignment wires that supply electric voltage to the color filter substrate are connected in a crossing condition, static electricity is induced in the crossing site and affects the distribution of an electric field between the array substrate assembly and the color filter substrate assembly of the liquid crystal display, leading to poor alignment of liquid crystal between the array substrate assembly and the color filter substrate assembly of the liquid crystal display.

SUMMARY OF THE INVENTION

The technical issue to be addressed in the present invention is to provide a liquid crystal display lower substrate assembly and a liquid crystal display, which help eliminate the wire crossing issue and thus prevent poor alignment of liquid crystal.

To achieve the above object, embodiments of the present invention provide the following technical solutions:

The present invention provides a liquid crystal display (LCD) lower substrate assembly, which is assembleable to an LCD upper substrate assembly to form an LCD. The LCD lower substrate assembly comprises a carrier board, a first alignment pad, a first alignment wire, and a first group of adaption pads having a function of electrical conduction, the first alignment pad, the first alignment wire, and the first-group adaption pads being all formed on the carrier board, the first alignment pad being electrically connected to the first alignment wire in order to receive a first voltage signal and to apply the first voltage signal to the first alignment wire, the first-group adaption pads being electrically connected to the first alignment wire in a spaced manner to receive the first voltage signal in order to transmit, after the assembly together of the LCD lower substrate assembly and the LCD upper substrate assembly, the first voltage signal to a first group of common electrodes arranged on a first upper substrate of the LCD upper substrate assembly, connection portions between the first-group adaption pads and the first alignment wire and the first-group adaption pads both not crossing any other alignment wires on the carrier board, except the first alignment wire.

In the above LCD lower substrate assembly, the LCD lower substrate assembly further comprises a second alignment pad, a second alignment wire, and a second group of adaption pads having a function of electric conduction, the second alignment pad, the second alignment wire, and the second-group adaption pads being all arranged on the carrier board, the second alignment pad being electrically connected to the second alignment wire in order to receive the first voltage signal and to apply the first voltage signal to the second alignment wire, the second group adaption pads being electrically connected to the second alignment wire in a spaced manner to receive the first voltage signal in order to transmit, after the assembly together of the LCD lower substrate assembly and the LCD upper substrate assembly, the first voltage signal to a second group of common electrodes arranged on the first upper substrate of the LCD upper substrate assembly, connection portions between the second-group adaption pads and the second alignment wire and the second-group adaption pads both not crossing any other alignment wires on the carrier board, except the second alignment wire.

In the above LCD lower substrate assembly, the first alignment wire and the second alignment wire are arranged along a circumferential portion of the carrier board and every two successive ones of the adaption pads of the first and second groups of adaption pads are spaced by a constant distance so that the adaption pads of the first and second groups are uniformly distributed along the circumferential portion of the carrier board.

In the above LCD lower substrate assembly, the LCD lower substrate assembly further comprises a third alignment pad, the third alignment pad being arranged on the carrier board, the first alignment pad and the second alignment pad being located on a first side portion of the carrier board, the third alignment pad being located on a second side portion of the carrier board that is opposite to the first side portion, the first alignment wire having a first end electrically connected to the first alignment pad and the first alignment wire further having a second end electrically connected to the third alignment pad to receive the first voltage signal via the first alignment pad and the third alignment pad and to apply the first voltage signal to the first alignment wire so as to transmit, after the assembly together of the LCD lower substrate assembly and the LCD upper substrate assembly, the first voltage signal to the first group of common electrodes of the first upper substrate and a first group of common electrodes of a second upper substrate of the LCD upper substrate assembly.

In the above LCD lower substrate assembly, the LCD lower substrate assembly further comprises a fourth alignment pad, the fourth alignment pad being arranged on the carrier board and located on the second side portion of the carrier board, the second alignment wire having a first end electrically connected to the second alignment pad and the second alignment wire further having a second end electrically connected to the fourth alignment pad to receive the first voltage signal via the second and fourth alignment pads and to apply the first voltage signal to the second alignment wire so as to transmit, after the assembly together of the LCD lower substrate assembly and the LCD upper substrate assembly, the first voltage signal to the second group of common electrodes of the first upper substrate and a second group of common electrodes of the second upper substrate of the LCD upper substrate assembly.

In the above LCD lower substrate assembly, the LCD lower substrate assembly further comprises a first lower substrate, a second lower substrate, a fifth alignment pad, a sixth alignment pad, a seventh alignment pad, an eighth alignment pad, a ninth alignment pad, a tenth alignment pad, a third alignment wire, a fourth alignment wire, and a fifth alignment wire, the first substrate, the second substrate, the third alignment wire, the fourth alignment wire, the fifth alignment wire, the fifth alignment pad, the sixth alignment pad, the seventh alignment pad, the eighth alignment pad, the ninth alignment pad, and the tenth alignment pad being all arranged on the carrier board, the first lower substrate corresponding to the first upper substrate, the second lower substrate corresponding to the second upper substrate, the third alignment wire having a first end electrically connected to the fifth alignment pad, the third alignment wire having a second end electrically connected to the sixth alignment pad, the fourth alignment wire having a first end electrically connected to the seventh alignment pad, the fourth alignment wire having a second end electrically connected to the eighth alignment pad, the fifth alignment wire having a first end electrically connected to the ninth alignment pad, the fifth alignment wire having a second end electrically connected to the tenth alignment pad, the first lower substrate comprising a first data line, a first gate line, and a first common electrode, the second lower substrate comprising a second data line, a second gate line, and a second common electrode, the first and second data lines being electrically connected to the third alignment wire, the first and second gate lines being electrically connected to the fourth alignment wire, the first and second common electrode being electrically connected to the fifth alignment wire.

In the above LCD lower substrate assembly, each adaption pad of the first-group adaption pads is connected via a first lead wire to the first alignment wire, each adaption pad of the second-group adaption pads being connected via a second lead wire to the second alignment wire, the first lead wires being the connection portions between the first-group adaption pads and the first alignment wire, the second lead wires being the connection portions between the second-group adaption pads and the second alignment wire.

In the above LCD lower substrate assembly, the first-group adaption pads are formed on the first alignment wire, the second-group adaption pads being formed on the second alignment wire, overlapping portions between the first alignment wire and the first-group adaption pads being the connection portions between the first-group adaption pads and the first alignment wire, overlapping portions between the second alignment wire and the second-group adaption pads being the connection portions between the second-group adaption pads and the second alignment wire.

The present invention also provides a liquid crystal display (LCD), which comprises an LCD upper substrate assembly and an LCD lower substrate assembly, the LCD upper substrate assembly comprising a first carrier board and a first upper substrate arranged on the first carrier board, the LCD lower substrate assembly comprising a second carrier board, a first alignment pad, a first alignment wire, and a first group of adaption pads having a function of electrical conduction, the first alignment pad, the first alignment wire, and the first-group adaption pads being all formed on the second carrier board, the first alignment pad being electrically connected to the first alignment wire in order to receive a first voltage signal and to apply the first voltage signal to the first alignment wire, the first-group adaption pads being electrically connected to the first alignment wire in a spaced manner to receive the first voltage signal in order to transmit, after the assembly together of the LCD lower substrate assembly and the LCD upper substrate assembly, the first voltage signal to a first group of common electrodes arranged on a first upper substrate of the LCD upper substrate assembly, connection portions between the first-group adaption pads and the first alignment wire and the first-group adaption pads both not crossing any other alignment wires on the second carrier board, except the first alignment wire.

In the above LCD, the LCD lower substrate assembly further comprises a second alignment pad, a second alignment wire, and a second group of adaption pads having a function of electric conduction, the second alignment pad, the second alignment wire, and the second-group adaption pads being all arranged on the second carrier board, the second alignment pad being electrically connected to the second alignment wire in order to receive the first voltage signal and to apply the first voltage signal to the second alignment wire, the second group adaption pads being electrically connected to the second alignment wire in a spaced manner to receive the first voltage signal in order to transmit, after the assembly together of the LCD lower substrate assembly and the LCD upper substrate assembly, the first voltage signal to a second group of common electrodes arranged on the first upper substrate of the LCD upper substrate assembly, connection portions between the second-group adaption pads and the second alignment wire and the second-group adaption pads both not crossing any other alignment wires on the second carrier board, except the second alignment wire.

In the above LCD, the first alignment wire and the second alignment wire are arranged along a circumferential portion of the carrier board and every two successive ones of the adaption pads of the first and second groups of adaption pads are spaced by a constant distance so that the adaption pads of the first and second groups are uniformly distributed along the circumferential portion of the carrier board.

In the above LCD, each adaption pad of the first-group adaption pads is connected via a first lead wire to the first alignment wire, each adaption pad of the second-group adaption pads being connected via a second lead wire to the second alignment wire, the first lead wires being the connection portions between the first-group adaption pads and the first alignment wire, the second lead wires being the connection portions between the second-group adaption pads and the second alignment wire.

In the above LCD, the first-group adaption pads are formed on the first alignment wire, the second-group adaption pads being formed on the second alignment wire, overlapping portions between the first alignment wire and the first-group adaption pads being the connection portions between the first-group adaption pads and the first alignment wire, overlapping portions between the second alignment wire and the second-group adaption pads being the connection portions between the second-group adaption pads and the second alignment wire.

The present invention provides an LCD lower substrate assembly, which comprises a carrier board, a first alignment pad, a first alignment wire, and a first group of adaption pads having a function of electrical conduction. The first alignment pad is electrically connected to the first alignment wire in order to receive a first voltage signal and to apply the first voltage signal to the first alignment wire. The first-group adaption pads are electrically connected to the first alignment wire in a spaced manner to receive the first voltage signal in order to transmit, after the assembly together of the LCD lower substrate assembly and the LCD upper substrate assembly, the first voltage signal to a first group of common electrodes arranged on a first upper substrate of the LCD upper substrate assembly. Connection portions between the first-group pads and the first alignment wire and the first-group adaption pads both do not cross any other alignment wires on the carrier board except the first alignment wire, this indicating the connection portions between the first-group pads and the first alignment wire and the first-group adaption pads both do not cross any other alignment wires on the carrier board, except the first alignment wire. Thus, no static electricity will be induced at the sites of the connection portions between the first-group pads and the first alignment wire and the first-group adaption pads, meaning no influence thereof on the distribution of an electric field between the LCD lower substrate assembly and the LCD upper substrate assembly will be caused, thereby eliminating an issue of poor alignment of the liquid crystal arranged between the LCD lower substrate assembly and the LCD upper substrate assembly.

BRIEF DESCRIPTION OF THE DRAWINGS

To more clearly explain the technical solution proposed in the present invention, a brief description of the drawings that are necessary for describing embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution proposed in an embodiment of the present invention with reference to the attached drawings of the embodiment of the present invention.

It is appreciated that when an element or a layer is referred to as being "on" another element or another layer or "connected to" or "coupled to" another element or another layer, it is directly on said another element or said another layer or directly connected to or coupled to said another element or said another layer or there may be an intervening element or layer existing therebetween. Oppositely, when an element is referred to as being "directly on" another element or layer or "directly connected to" or "directly coupled to" another element or layer, there is no intervening element of layer exiting therebetween. The same references are always used to designate the same elements. The term "and/or" as used herein includes any and all combinations of one or more associated items.

It is appreciated that although terminology, such as first and second, is used to describe various elements, components, areas, layers and/or parts, these element, components, areas, layers and/or parts are not limited by the terminology. The terminology is used solely for distinguishing an element, component, area, layer or part from another element, component, area, layer or part. Thus, in the following discussion, a first element, component, area, layer or part may also be referred to as a second element, component, area, layer or part but not violating the teaching of the present invention.

For easy reference, spatial relationship terms, such as "under", "below, "beneath", "on", and "above", as used herein, are used to define the relationship between one element or feature with respect to another element(s) or feature(s) as illustrated in the drawings. It is appreciated that the spatial relationship terms used are intended to cover the direction illustrated in the drawings, but the direction of a device may be different in the use or operation thereof. For example, if a device illustrated in the drawings is shown in an up-side down manner, then the element that is referred to as "below" or "under" another element or feature is located "above" said another element or feature. Thus, the illustrative term "under" may cover both upward and downward directions. The device may be oriented in other directions (such as being rotated by 90 degrees or set at other directions) and the spatial relationship terms used herein should be interpreted in this way.

The terms used herein are provided for describing specific embodiments and are not intended to limit the scope of the present invention. Unless expressly indicated, singular form, such as "one" and "a", as used herein is intended to cover plural form. It is further appreciated here that in the present disclosure, the use of the term "comprise" and/or "include" refers the existence of the mentioned feature, entirety, step, operation, element and/or assembly does not exclude the existence or presence of one or more other features, entireties, steps, operations, elements, assemblies and/or combinations thereof.

Unless indicated otherwise, all the terms (include technical terms and scientific terms) used herein designate the same meaning as what generally understood by those having ordinary skills in the art. It is further appreciated that the terms that are commonly defined in dictionaries should be interoperated as including the same meaning as the contents that they posses in the related contexts and should not be interpreted in an idealized or excessively interpreted manner, unless they are clearly defined so.

Figure 1:
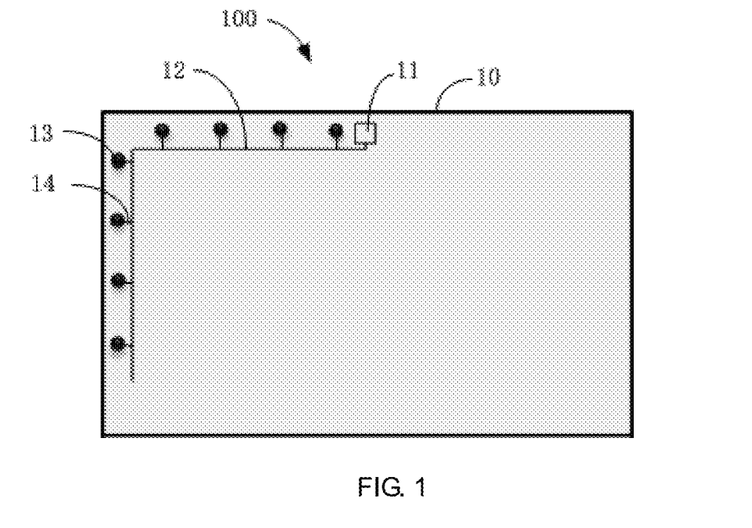
FIG. 1 is a schematic view illustrating a liquid crystal display lower substrate assembly according to a first preferred embodiment of the present invention.

Referring to FIG. 1, a first preferred embodiment of the present invention provides a liquid crystal display (LCD) lower substrate assembly 100. The LCD lower substrate assembly 100 is used to assemble with an LCD upper substrate assembly (not shown) to form an LCD. The LCD lower substrate assembly 100 comprises a carrier board 10, a first alignment pad 11, a first alignment wire 12, and a first group of adaption pads 13 having a function of electrical conduction. The first alignment pad 11, the first alignment wire 12, and the first-group adaption pads 13 are all formed on the carrier board 10. The first alignment pad 11 is electrically connected to the first alignment wire 12 in order to receive a first voltage signal and to apply the first voltage signal to the first alignment wire 12. The first-group adaption pads 13 are electrically connected to the first alignment wire 12 in a spaced manner to receive the first voltage signal in order to transmit, after the assembly together of the LCD lower substrate assembly 100 and the LCD upper substrate assembly, the first voltage signal to a first group of common electrodes arranged on a first upper substrate of the LCD upper substrate assembly. Connection portions 14 between the first-group adaption pads 13 and the first alignment wire 12 and the first-group adaption pads 13 both do not cross any other alignment wires on the carrier board 10, except the first alignment wire 12.

It is noted here that, the carrier board 10 further comprises a plurality of alignment wires (not shown) for conducting alignment of liquid crystal between the LCD lower substrate assembly 100 and the LCD upper substrate assembly. The connection portions 14 between the first-group pads 13 and the first alignment wire 12 and the first-group adaption pads 13 both not intersecting any other alignment wires on the carrier board 10 except the first alignment wire 12 indicates the connection portions 14 between the first-group pads 13 and the first alignment wire 12 and the first-group adaption pads 13 both do not cross the plurality of alignment wires arranged on the carrier board 10.

The LCD lower substrate assembly can be array substrate assembly. The LCD upper substrate assembly can be a color filter substrate assembly. Generally, a voltage of a color filter substrate of the color filter substrate assembly is supplied from the array substrate assembly so that it is necessary to supply the first voltage signal from the first alignment pad to common electrodes on the color filter substrate. The carrier board 10 is an insulation board, preferably a glass board. The array substrate assembly further comprises an array substrate. The array substrate is arranged on the carrier board 10 to correspond to the color filter substrate. Similarly, the color filter substrate assembly also comprises a carrier board and the color filter substrate arranged on the carrier board.

It is noted here that the present invention does not limit the LCD lower substrate assembly 100 to be an array substrate assembly and if, according to a practical need or due to progress of technology, the voltage of the array substrate needs to be supplied from the color filter substrate, the structure of the LCD lower substrate assembly 100 is also applicable to the color filter substrate assembly and the LCD lower substrate assembly 100 may alternatively be the color filter substrate assembly.

In the instant embodiment, the LCD lower substrate assembly 100 comprises a carrier board 10, a first alignment pad 11, a first alignment wire 12, and the first group of adaption pads 13 having a function of electrical conduction. The first alignment pad 11, the first alignment wire 12, and the first-group adaption pads 13 are all formed on the carrier board 10. The first alignment pad 11 is electrically connected to the first alignment wire 12 in order to receive a first voltage signal and to apply the first voltage signal to the first alignment wire 12. The first-group adaption pads 13 are electrically connected to the first alignment wire 12 in a spaced manner to receive the first voltage signal in order to transmit, after the assembly together of the LCD lower substrate assembly 100 and the LCD upper substrate assembly, the first voltage signal to a first group of common electrodes arranged on a first upper substrate of the LCD upper substrate assembly. Connection portions 14 between the first-group adaption pads 13 and the first alignment wire 12 and the first-group adaption pads 13 both do not cross any other alignment wires on the carrier board 10, except the first alignment wire 12, this indicating the connection portions 14 between the first-group pads 13 and the first alignment wire 12 and the first-group adaption pads 13 both do not cross any alignment wire arranged on the carrier board 10. Thus, no static electricity will be induced at the sites of the connection portions 14 between the first-group pads 13 and the first alignment wire 12 and the first-group adaption pads 13, meaning no influence thereof on the distribution of an electric field between the LCD lower substrate assembly 100 and the LCD upper substrate assembly will be caused, thereby eliminating an issue of poor alignment of the liquid crystal arranged between the LCD lower substrate assembly 100 and the LCD upper substrate assembly.

Further, in the instant embodiment, each adaption pad of the first-group adaption pads 13 is connected via a first lead wire to the first alignment wire 12. The first lead wires serve as the connection portions 14 between the first-group adaption pads 13 and the first alignment wire 12.

In other embodiments, the first-group adaption pads 13 may be formed on the first alignment wire 12. Overlapping portions between the first alignment wire 12 and the first-group adaption pads 13 serve as the connection portions 14 between the first-group adaption pads 13 and the first alignment wire 12.

Figure 2:
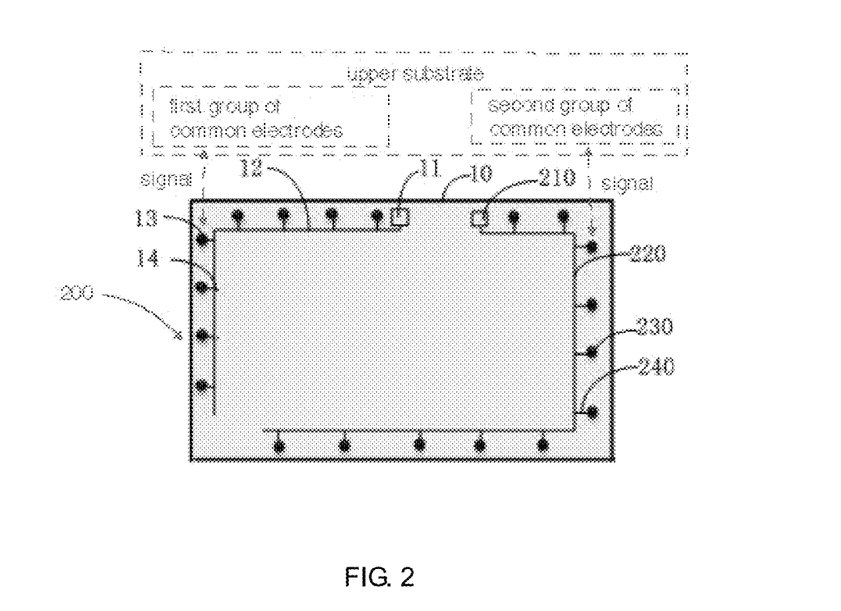
FIG. 2 is a schematic view illustrating a liquid crystal display lower substrate assembly according to a second preferred embodiment of the present invention.

Referring to FIG. 2, a second preferred embodiment of the present invention provides an LCD lower substrate assembly 200. The LCD lower substrate assembly 200 of the second preferred embodiment is similar to the LCD lower substrate 100 of the first preferred embodiment and a difference between the two is that in the second preferred embodiment, the LCD lower substrate assembly 200 further comprises a second alignment pad 210, a second alignment wire 220, and a second group of adaption pads 230 having a function of electric conduction. The second alignment pad 210, the second alignment wire 220, and the second-group adaption pads 230 are all arranged on the carrier board 10. The second alignment pad 210 is electrically connected to the second alignment wire 220 in order to receive the first voltage signal and to apply the first voltage signal to the second alignment wire 220. The second group adaption pads 230 are electrically connected to the second alignment wire 220 in a spaced manner to receive the first voltage signal in order to transmit, after the assembly together of the LCD lower substrate assembly 200 and an LCD upper substrate assembly, the first voltage signal to a second group of common electrodes arranged on the first upper substrate of the LCD upper substrate assembly. Connection portions 240 between the second-group adaption pads 230 and the second alignment wire 220 and the second-group adaption pads 230 both do not cross any other alignment wires on the carrier board 10, except the second alignment wire 220.

Each adaption pad of the second-group adaption pads 230 is connected via a second lead wire to the second alignment wire 220. The second lead wires serve as the connection portions 240 between the second-group adaption pads 230 and the second alignment wire 220.

In other embodiments, the second-group adaption pads 230 may be formed on the second alignment wire 220. Overlapping portions between the second alignment wire 220 and the second-group adaption pads 230 serve as the connection portions 240 between the second-group adaption pads 230 and the second alignment wire 220.

In the instant embodiment, the connection portions 240 between the second-group adaption pads 230 and the second alignment wire 220 and the second-group adaption pads 230 both do not cross any other alignment wires on the carrier board 10, except the second alignment wire 220. This indicates the connection portions 240 between the second-group pads 230 and the second alignment wire 220 and the second-group adaption pads 230 both do not cross any alignment wire arranged on the carrier board 10. Thus, no static electricity will be induced at the sites of the connection portions 14 between the second-group pads 230 and the second alignment wire 220 and the second-group adaption pads 230, meaning no influence thereof on the distribution of an electric field between the LCD lower substrate assembly 200 and the LCD upper substrate assembly will be caused, thereby eliminating an issue of poor alignment of the liquid crystal arranged between the LCD lower substrate assembly 200 and the LCD upper substrate assembly. Further, the LCD lower substrate assembly 200 additionally includes the second alignment wire 220 and the second-group adaption pads 230 electrically connected to the second alignment wire 220 so that voltage can be supplied to a second group of common electrodes on the LCD upper substrate assembly. Thus, the LCD lower substrate assembly 200 helps improve homogeneity of voltage applied to the LCD upper substrate.

Further, the first alignment wire 12 and the second alignment wire 220 are arranged along a circumferential portion of the carrier board 10. Every two successive ones of the adaption pads of the first and second groups of adaption pads 13, 230 are spaced by a constant distance so that the adaption pads 13, 230 of the first and second groups are uniformly distributed along the circumferential portion of the carrier board 10 thereby further improving homogeneity of voltage applied to the LCD upper substrate assembly.

Figure 3:
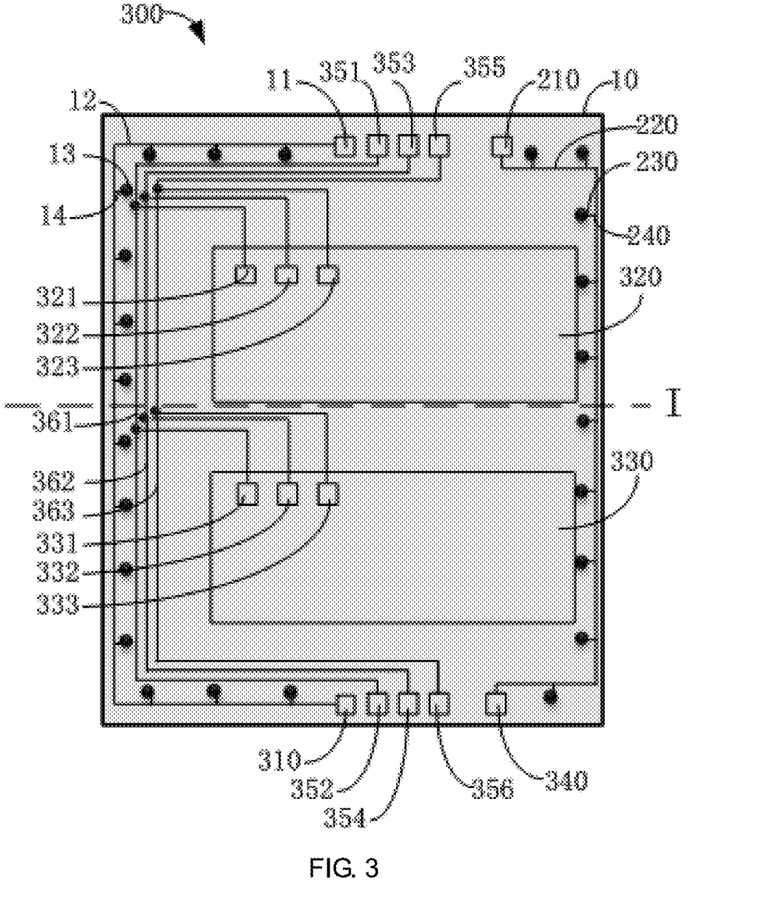
FIG. 3 is a schematic view illustrating a liquid crystal display lower substrate assembly according to a third preferred embodiment of the present invention.

Referring next to FIG. 3, a third preferred embodiment of the present invention provides an LCD lower substrate assembly 300. The LCD lower substrate assembly 300 of the third preferred embodiment is similar to the LCD lower substrate 200 of the second preferred embodiment provides and a difference between the two is that in the third preferred embodiment, the LCD lower substrate assembly 300 further comprises a third alignment pad 310. The third alignment pad 310 is arranged on the carrier board 10. The first alignment pad 11 and the second alignment pad 210 are located on a first side portion of the carrier board 10. The third alignment pad 310 is located on a second side portion of the carrier board 10 that is opposite to the first side portion. The first alignment wire 12 has a first end electrically connected to the first alignment pad 11 and the first alignment wire 12 has a second end electrically connected to the third alignment pad 310 to receive the first voltage signal via the first alignment pad 11 and the third alignment pad 310 and to apply the first voltage signal to the first alignment wire 12 so as to transmit, after the assembly together of the LCD lower substrate assembly 300 and an LCD upper substrate assembly, the first voltage signal to a first group of common electrodes of a first upper substrate and a first group of common electrodes of a second upper substrate of the LCD upper substrate assembly.

Specifically, the LCD lower substrate assembly 300 further comprises a first lower substrate 320 and a second lower substrate 330. The first lower substrate 320 and the second lower substrate 330 are sequentially arranged on the carrier board 10 in a direction from the first side portion to the second side portion of the carrier board 10. The first lower substrate 320 corresponds to the first upper substrate. The second lower substrate 330 corresponds to the second upper substrate.

It is noted here that, the LCD lower substrate assembly 300 according to the instant preferred embodiment is applicable to a manufacturing stage of an LCD lower substrate. The carrier board 10 comprises a division line I, which divides the carrier board into a first sub-carrier board and a second sub-carrier board, so as to divide the LCD lower substrate assembly 300 into a first portion and a second portion. Functions and operations of the first portion and the second portion are generally identical. In other words, the first lower substrate 320 and the second lower substrate 330 are identical. The first lower substrate 320 and the first alignment pad 11 are arranged on the first sub-carrier board. The second lower substrate 330 and the third alignment pad 230 are arranged on the second sub-carrier board. After completion of the manufacturing process of the display lower substrate assembly, the LCD lower substrate assembly 300 is cut along the division line I to form two independent LCD lower substrate assemblies. In other words, two of the LCD lower substrate assembly 100 of the first preferred embodiment are provided. Similarly, the LCD upper substrate assembly that corresponds to the LCD lower substrate assembly 300 can also be divided into two LCD upper substrate assemblies. After the assembly of each of the LCD lower substrate assemblies so cut with the corresponding LCD upper substrate assembly so cut, liquid crystal is filled between the LCD lower substrate assembly and the corresponding LCD upper substrate assembly to form an LCD.

The first alignment pad 11 may supply, via the first alignment wire located on the first portion and the adaption pads of the first-group adaption pads that are located on the first portion, a first voltage signal to the corresponding first upper substrate. The second alignment pad 230 may supply, via the first alignment wire located on the second portion and the adaption pads of the first-group adaption pads located on the second portion, a first voltage signal to the corresponding second upper substrate.

Further, the LCD lower substrate assembly 300 further comprises a fourth alignment pad 340. The fourth alignment pad 340 is arranged on the carrier board 10 and is located on the second side portion of the carrier board 10. The second alignment wire 220 has a first end electrically connected to the second alignment pad 210 and the second alignment wire 220 has a second end electrically connected to the fourth alignment pad 340 to receive the first voltage signal via the second and fourth alignment pads 210, 340 and to apply the first voltage signal to the second alignment wire 220 so as to transmit, after the assembly together of the LCD lower substrate assembly 300 and an LCD upper substrate assembly, the first voltage signal to the second group of common electrodes of the first upper substrate and a second group of common electrodes of the second upper substrate of the LCD upper substrate assembly 300.

Specifically, after the LCD lower substrate assembly 300 and the LCD upper substrate assembly are assembled together, the first voltage signal is supplied through the second alignment pad 210, the second alignment wire located on the first portion, and the adaption pads of the second-group adaption pads that are located on the first portion to the second-group common electrodes of the first upper substrate of the LCD upper substrate assembly 300. The first voltage signal is also supplied through the fourth alignment pad 340, the second alignment wire located on the second portion, and the adaption pads of the second-group adaption pads that are located on the second portion to the second-group common electrodes of the second upper substrate of the LCD upper substrate assembly 300.

The first alignment wire 12 and the second alignment wire 220 are arranged along a circumferential portion of the carrier board 10. Every two successive ones of the adaption pads of the first and second groups of adaption pads 13, 230 are spaced by a constant distance so that the adaption pads 13, 230 of the first and second groups are uniformly distributed along the circumferential portion of the carrier board 10 thereby further improving homogeneity of voltage applied to the LCD upper substrate assembly.

Further, the LCD lower substrate assembly 300 further comprises a fifth alignment pad 351, a sixth alignment pad 352, a seventh alignment pad 353, an eighth alignment pad 354, a ninth alignment pad 355, a tenth alignment pad 356, a third alignment wire 361, a fourth alignment wire 362, and a fifth alignment wire 363. The third alignment wire 361, the fourth alignment wire 362, the fifth alignment wire 363, the fifth alignment pad 351, the sixth alignment pad 352, the seventh alignment pad 353, the eighth alignment pad 354, the ninth alignment pad 355, and the tenth alignment pad 356 are all arranged on the carrier board 10. The third alignment wire 361 has a first end electrically connected to the fifth alignment pad 351. The third alignment wire 361 has a second end electrically connected to the sixth alignment pad 352. The fourth alignment wire 362 has a first end electrically connected to the seventh alignment pad 353. The fourth alignment wire 362 has a second end electrically connected to the eighth alignment pad 354. The fifth alignment wire 363 has a first end electrically connected to the ninth alignment pad 355. The fifth alignment wire 363 has a second end electrically connected to the tenth alignment pad 356. The first lower substrate 320 comprises a first data line 321, a first gate line 322, and a first common electrode 323. The second lower substrate 330 comprises a second data line 331, a second gate line 332, and a second common electrode 333. The first and second data lines 321, 331 are both electrically connected to the third alignment wire 361. The first and second gate lines 322, 332 are both electrically connected to the fourth alignment wire 362. The first and second common electrodes 323, 333 are both electrically connected to the fifth alignment wire 363.

In the instant embodiment, the first lower substrate 320 and the second lower substrate 330 share the third to fifth alignment wires 361-363 and do not individually take three alignment wires so that the number of the alignment wires laid on the carrier board 10 can be reduced. Since the number of the alignment wires is reduced, the chance of wire crossing on the carrier board 10 is greatly reduced to thereby reduce the chance of poor alignment of liquid crystal.

Figure 4:
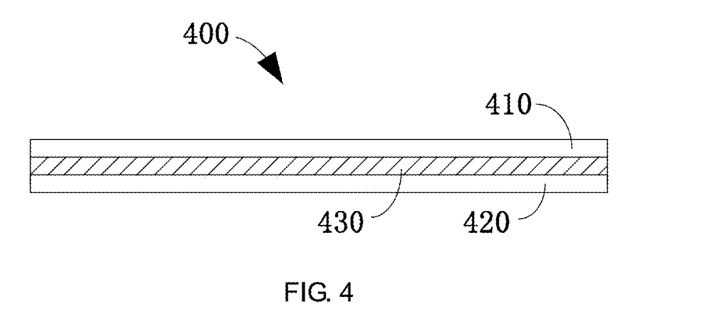
FIG. 4 is a schematic view illustrating a liquid crystal display according to a fourth preferred embodiment of the present invention.

Referring to FIGS. 1 and 4, a preferred embodiment of the present invention provides an LCD 400. The LCD 400 comprises an LCD upper substrate assembly 410 and an LCD lower substrate assembly 420. The LCD upper substrate assembly 410 comprises a first carrier board (not shown) and a first upper substrate (not shown) arranged on the first carrier board. The LCD lower substrate assembly 420 can be an LCD lower substrate assembly 100 of the first preferred embodiment that is described above. The structure and functionality of the LCD lower substrate assembly 420 are exactly identical to the structure and functionality of the LCD lower substrate assembly 100. Details can be referred to the above description with reference to the LCD lower substrate 100 of the first preferred embodiment and repeated description will be omitted herein. It is apparent that the LCD lower substrate assembly 420 can alternatively be an LCD lower substrate assembly 200 of the second preferred embodiment that is described above.

It is noted here that the LCD 400 further comprises liquid crystal 430. The liquid crystal 430 is arranged between the LCD upper substrate assembly 410 and the LCD lower substrate assembly 420.

The instant embodiment provides an LCD 400 that comprises an LCD lower substrate assembly 100. The LCD lower substrate assembly 100 comprises a carrier board 10, a first alignment pad 11, a first alignment wire 12, and a first group of adaption pads 13 having a function of electrical conduction. The first alignment pad 11 is electrically connected to the first alignment wire 12 in order to receive a first voltage signal and to apply the first voltage signal to the first alignment wire 12. The first-group adaption pads 13 are electrically connected to the first alignment wire 12 in a spaced manner to receive the first voltage signal in order to transmit, after the assembly together of the LCD lower substrate assembly 100 and the LCD upper substrate assembly, the first voltage signal to a first group of common electrodes arranged on a first upper substrate of the LCD upper substrate assembly. Connection portions 14 between the first-group pads 13 and the first alignment wire 12 and the first-group adaption pads 13 both do not cross any other alignment wires on the carrier board 10 except the first alignment wire 12 (meaning there is no wire crossing), this indicating the connection portions 14 between the first-group pads 13 and the first alignment wire 12 and the first-group adaption pads 13 both do not cross any other alignment wires on the carrier board 10, except the first alignment wire 12. Thus, no static electricity will be induced at the sites of the connection portions 14 between the first-group pads 13 and the first alignment wire 12 and the first-group adaption pads 13, meaning no influence thereof on the distribution of an electric field between the LCD lower substrate assembly 100 and the LCD upper substrate assembly will be caused, thereby eliminating an issue of poor alignment of the liquid crystal arranged between the LCD lower substrate assembly 100 and the LCD upper substrate assembly.

Disclosed above is a preferred embodiment of the present invention. It is appreciated that those having ordinary skills of the art may readily appreciate that various improvements and modifications without departing the principle of the present invention. These improvements and modifications are considered within the protection scope covered by the present invention.

What is claimed is:

1. A liquid crystal display (LCD) lower substrate assembly, which is assembleable to an LCD upper substrate assembly to form an LCD, wherein the LCD lower substrate assembly comprises a carrier board, a first alignment pad, a first alignment wire, and first-group adaption pads having a function of electrical conduction, the first alignment pad, the first alignment wire, and the first-group adaption pads being all formed on the carrier board, the first alignment pad being electrically connected to the first alignment wire in order to receive a first voltage signal and to apply the first voltage signal to the first alignment wire, the first-group adaption pads being electrically connected to the first alignment wire in a spaced manner to receive the first voltage signal and adapted to feed the first voltage signal to a first group of common electrodes arranged on a first upper substrate of the LCD upper substrate assembly, wherein connection portions between the first-group adaption pads and the first alignment wire and the first-group adaption pads are not crossing any other alignment wires on the carrier board, except the first alignment wire, wherein the LCD lower substrate assembly further comprises a second alignment pad, a second alignment wire, and second-group adaption pads having a function of electric conduction, the second alignment pad, the second alignment wire, and the second-group adaption pads being all arranged on the carrier board, the second alignment pad being electrically connected to the second alignment wire in order to receive the first voltage signal and to apply the first voltage signal to the second alignment wire, the second-group adaption pads being electrically connected to the second alignment wire in a spaced manner to receive the first voltage signal and adapted to feed the first voltage signal to a second group of common electrodes arranged on the first upper substrate of the LCD upper substrate assembly, wherein connection portions between the second-group adaption pads and the second alignment wire and the second-group adaption pads are not crossing any other alignment wires on the carrier board, except the second alignment wire, and wherein the first alignment wire and the second alignment wire are arranged along a circumferential portion of the carrier board and every two successive ones of the adaption pads of the first and second groups of adaption pads are spaced by a constant distance so that the adaption pads of the first and second groups are uniformly distributed along the circumferential portion of the carrier board.

2. The LCD lower substrate assembly as claimed in claim 1, wherein the LCD lower substrate assembly further comprises a third alignment pad, the third alignment pad being arranged on the carrier board, the first alignment pad and the second alignment pad being located on a first side portion of the carrier board, the third alignment pad being located on a second side portion of the carrier board that is opposite to the first side portion, the first alignment wire having a first end electrically connected to the first alignment pad and the first alignment wire further having a second end electrically connected to the third alignment pad to receive the first voltage signal via the first alignment pad and the third alignment pad and to apply the first voltage signal to the first alignment wire so as to transmit, after the assembly together of the LCD lower substrate assembly and the LCD upper substrate assembly, the first voltage signal to the first group of common electrodes of the first upper substrate and a first group of common electrodes of a second upper substrate of the LCD upper substrate assembly.

3. The LCD lower substrate assembly as claimed in claim 2, wherein the LCD lower substrate assembly further comprises a fourth alignment pad, the fourth alignment pad being arranged on the carrier board and located on the second side portion of the carrier board, the second alignment wire having a first end electrically connected to the second alignment pad and the second alignment wire further having a second end electrically connected to the fourth alignment pad to receive the first voltage signal via the second and fourth alignment pads and to apply the first voltage signal to the second alignment wire so as to transmit, after the assembly together of the LCD lower substrate assembly and the LCD upper substrate assembly, the first voltage signal to the second group of common electrodes of the first upper substrate and a second group of common electrodes of the second upper substrate of the LCD upper substrate assembly.

4. The LCD lower substrate assembly as claimed in claim 3, wherein the LCD lower substrate assembly further comprises a first lower substrate, a second lower substrate, a fifth alignment pad, a sixth alignment pad, a seventh alignment pad, an eighth alignment pad, a ninth alignment pad, a tenth alignment pad, a third alignment wire, a fourth alignment wire, and a fifth alignment wire, the first substrate, the second substrate, the third alignment wire, the fourth alignment wire, the fifth alignment wire, the fifth alignment pad, the sixth alignment pad, the seventh alignment pad, the eighth alignment pad, the ninth alignment pad, and the tenth alignment pad being all arranged on the carrier board, the first lower substrate corresponding to the first upper substrate, the second lower substrate corresponding to the second upper substrate, the third alignment wire having a first end electrically connected to the fifth alignment pad, the third alignment wire having a second end electrically connected to the sixth alignment pad, the fourth alignment wire having a first end electrically connected to the seventh alignment pad, the fourth alignment wire having a second end electrically connected to the eighth alignment pad, the fifth alignment wire having a first end electrically connected to the ninth alignment pad, the fifth alignment wire having a second end electrically connected to the tenth alignment pad, the first lower substrate comprising a first data line, a first gate line, and a first lower-substrate common electrode, the second lower substrate comprising a second data line, a second gate line, and a second lower-substrate common electrode, the first and second data lines being electrically connected to the third alignment wire, the first and second gate lines being electrically connected to the fourth alignment wire, the first and second low-substrate common electrodes being electrically connected to the fifth alignment wire.

5. The LCD lower substrate assembly as claimed in claim 1, wherein each adaption pad of the first-group adaption pads is connected via a first lead wire to the first alignment wire, each adaption pad of the second-group adaption pads being connected via a second lead wire to the second alignment wire, the first lead wires being the connection portions between the first-group adaption pads and the first alignment wire, the second lead wires being the connection portions between the second-group adaption pads and the second alignment wire.

6. The LCD lower substrate assembly as claimed in claim 1, wherein the first-group adaption pads are formed on the first alignment wire, the second-group adaption pads being formed on the second alignment wire, overlapping portions between the first alignment wire and the first-group adaption pads being the connection portions between the first-group adaption pads and the first alignment wire, overlapping portions between the second alignment wire and the second-group adaption pads being the connection portions between the second-group adaption pads and the second alignment wire.

7. A liquid crystal display (LCD), comprising an LCD upper substrate assembly and an LCD lower substrate assembly, the LCD upper substrate assembly comprising a first carrier board and a first upper substrate arranged on the first carrier board, the LCD lower substrate assembly comprising a second carrier board, a first alignment pad, a first alignment wire, and first-group adaption pads having a function of electrical conduction, the first alignment pad, the first alignment wire, and the first-group adaption pads being all formed on the second carrier board, the first alignment pad being electrically connected to the first alignment wire in order to receive a first voltage signal and to apply the first voltage signal to the first alignment wire, the first-group adaption pads being electrically connected to the first alignment wire in a spaced manner to receive the first voltage signal and adapted to feed the first voltage signal to a first group of common electrodes arranged on a first upper substrate of the LCD upper substrate assembly, wherein connection portions between the first-group adaption pads and the first alignment wire and the first-group adaption pads are not crossing any other alignment wires on the second carrier board, except the first alignment wire, wherein the LCD lower substrate assembly further comprises a second alignment pad, a second alignment wire, and second-group adaption pads having a function of electric conduction, the second alignment pad, the second alignment wire, and the second-group adaption pads being all arranged on the second carrier board, the second alignment pad being electrically connected to the second alignment wire in order to receive the first voltage signal and to apply the first voltage signal to the second alignment wire, the second group second-group adaption pads being electrically connected to the second alignment wire in a spaced manner to receive the first voltage signal and adapted to feed the first voltage signal to a second group of common electrodes arranged on the first upper substrate of the LCD upper substrate assembly, wherein connection portions between the second-group adaption pads and the second alignment wire and the second-group adaption pads are not crossing any other alignment wires on the second carrier board, except the second alignment wire, and wherein the first alignment wire and the second alignment wire are arranged along a circumferential portion of the carrier board and every two successive ones of the adaption pads of the first and second groups of adaption pads are spaced by a constant distance so that the adaption pads of the first and second groups are uniformly distributed along the circumferential portion of the carrier board.

8. The LCD as claimed in claim 7, wherein each adaption pad of the first-group adaption pads is connected via a first lead wire to the first alignment wire, each adaption pad of the second-group adaption pads being connected via a second lead wire to the second alignment wire, the first lead wires being the connection portions between the first-group adaption pads and the first alignment wire, the second lead wires being the connection portions between the second-group adaption pads and the second alignment wire.

9. The LCD as claimed in claim 7, wherein the first-group adaption pads are formed on the first alignment wire, the second-group adaption pads being formed on the second alignment wire, overlapping portions between the first alignment wire and the first-group adaption pads being the connection portions between the first-group adaption pads and the first alignment wire, overlapping portions between the second alignment wire and the second-group adaption pads being the connection portions between the second-group adaption pads and the second alignment wire.

* * * * *